Dec. 10, 1946.  H. M. BACH  2,412,438

PIEZO-CRYSTAL HOLDER

Filed Oct. 12, 1943

INVENTOR
HENRY M. BACH
BY John J. Rogan
ATTORNEY

Patented Dec. 10, 1946

2,412,438

UNITED STATES PATENT OFFICE 2,412,438

PIEZO-CRYSTAL HOLDER

Henry M. Bach, Lawrence, N. Y., assignor to Premier Crystal Laboratories, Inc., New York, N. Y., a corporation of New York Application October 12, 1943, Serial No. 505,915

14 Claims. (Cl. 171—327)

The invention relates to piezo-crystal holders and more especially to holders for crystals which are to be peripherally retained or restrained at a plurality of points.

The principal object of the invention is to provide a novel form of crystal-retaining means whereby polygonal crystals can be readily assembled and oriented.

Another principal object is to provide an improved retaining and orienting arrangement for piezo-crystals arranged to utilize the well known "thickness" shear mode of vibration.

A feature of the invention relates to an adjustable retaining arrangement for piezo-crystals whereby a crystal holder can be used with polygonal crystals of widely different dimensional sizes.

Another feature relates to a retainer arrangement for polygonal crystals, one part of the retainer being fixed and cooperating with two adjacent edges of the crystal to orient the crystal within the holder, the other two parts being independently adjustable.

A further feature relates to a retaining arrangement for piezo-crystals, comprising a plurality of retainer members, one of which is fixed and provided with spaced projections arranged to cooperate with adjacent edges of a crystal at predetermined points, the other members being independently adjustable toward and away from the opposite edges of the crystal and in substantially the same plane as said spaced projections.

A further feature relates to a retaining and orienting arrangement for polygonal crystals, employing a system or arrangement of localized pointed abutments to limit the crystal translational and rotational movements.

A still further feature relates to a novel and easily adjustable retainer arrangement for edge-clamped crystals.

Other features and advantages not specifically enumerated will be apparent after a consideration of the following descriptions and the appended claims.

Inasmuch as the invention is concerned primarily with the retainer means for a crystal, such means will be disclosed in one simple form of crystal holder or housing. It will be understood, of course, that the inventive concept can be embodied in a wide variety of crystal holders of known constructions. Accordingly in the drawing Figure 1 is a side view of a crystal holder with parts broken away to show one embodiment of the invention more clearly.

Figures 1, 6, 7:
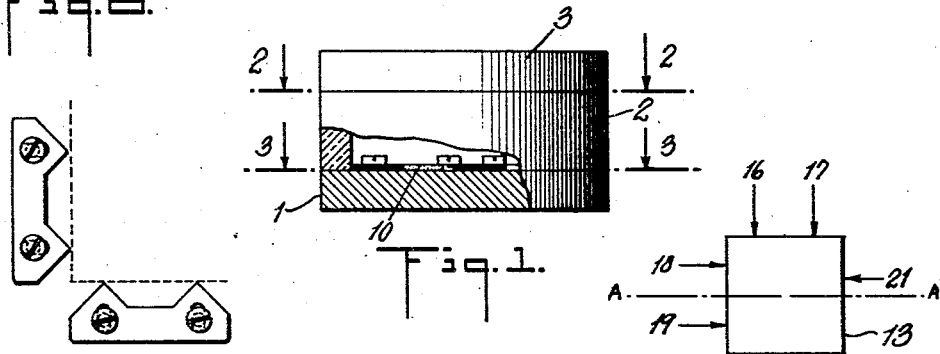
Figure 6 is an illustration of a still further embodiment.
Figure 7 is a diagrammatic view explanatory of the invention.
Figure 2:
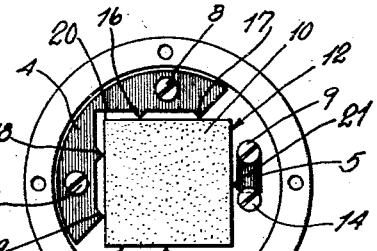
Figure 2 is a sectional view of Figure 1 along the line 2—2 thereof.

In the particular embodiments of Figures 1 and 2, the crystal housing may be of any well known construction comprising for example a metal base 1; a cylindrical insulator wall 2 of porcelain, ceramic or the like; and a top metal cover 3. An electrode (not shown) is adjustably carried by the cover 3 so as to vary the air gap between the electrode and the upper surface of the crystal 10. For a detailed description of a housing and electrode structure of this type reference may be had to Patent No. 1,790,355 to H. O. Peterson.

Attached to the base 1 is a crystal retainer arrangement comprising parts 4, 5 and 6 which may be made from thin metal stock or, if desired, they may be made from thin insulator stock. Member 4 is firmly fastened to the base 1 by screws 7 and 8 against sliding movement. Member 5 is fastened against base 1 by screw 9 around which it can pivot for adjustment towards the edge 12 of the crystal. Likewise member 6 is fastened to base 1 by screw 11. By partially loosening the screws 9 and 11, the members 5 and 6 can be independently adjusted with relation to the respective crystal edges 12 and 13. When the members 5 and 6 have been appropriately adjusted, screws 14 and 15, whose flat heads respectively overlie the ends of members 5 and 6, can be tightened to maintain the adjusted position, whereupon screws 9 and 11 can likewise be tightened.

In order that the retaining forces may be applied at preselected restricted points or zones on the respective crystal edges, the member 4 is notched such as with V-shape or circular shape on its reentrant edge, and the sides of the notch are provided each with a pair of spaced V-shaped points or projections 16, 17 and 18, 19. In the case of a square or rectangular crystal the reentrant notch of member 4 is a right angle, and the base of the notch is cut out sufficiently with relation to points 16 and 18 so that the corner 20 of the crystal does not touch member 4 except at the said points 16 to 19. It will be understood that the projections 16 to 19 are located that the crystal corner 20 engages the projections 16 and 18 at corresponding predetermined points along the corresponding crystal edges. While the drawing shows the projections 16 to 19 on a single member 4, it will be understood that the member 4 may be in two parts, one part carrying the projections 16, 17, the other part carrying the projections 18, 19, as shown in Figure 6.

Preferably the members 5 and 6 are located so that their pointed projections 21 and 22 engage the edges 12 and 13 at their centers. In no case should the triangle defined by projections 16, 17, 22, or the triangle defined by projections 18, 19, 21, have any angle equal to or greater than 90°.

With this type of retaining arrangement, square or rectangular crystals can be very readily located, and retained at all edges. The member 4 by reason of its right angle shape and by reason of the double pointed projections on each side, accurately locates and orients the crystal with respect to its surroundings. The members 5 and 6 can, therefore be readily adjusted and fastened with respect to the crystal edges.

While in the particular arrangement shown in the drawing, the triangles 16, 17 and 22, and 18, 19 and 21, are isosceles triangles, it will be understood that these triangles may be of any kind provided they have no interior angle which is equal to or greater than 90°. Thus, referring to Figure 7, the location of the points 16, 17 and 22, constrains the crystal so that it cannot rotate. The only movement possible is a translation along the A—A axis. The location of points 19 and 21 on opposite sides of the altitude of triangle 16, 17, 22, will therefore restrict the movement of the crystal 13 completely. When the crystal is square, the triangles 16, 17, 22, and 18, 19, 21, may be substantially equilateral. It will be clear of course, that the principle of the invention is not limited to square crystals but is applicable to any polygonal crystal.

The above described manner of retaining the crystal is of particular importance in certain types of crystal vibration such as so-called x—y or thickness shear mode of vibration caused by an electrical field having component in Y direction, although it will be understood, of course, that the invention is not limited to any particular mode of vibration.

Figures 3, 4:
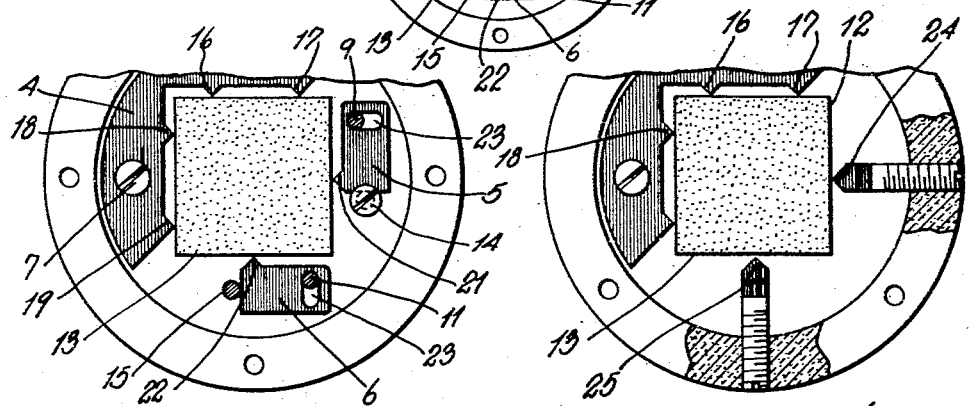
Figure 3 is a sectional view similar to that of Figure 2 but of a different embodiment.
Figure 4 is a partial view showing another embodiment.

Instead of merely mounting the members 5 and 6 for turning or pivoting movement around the respective screws 9 and 11, each of the members 5 and 6 may be provided with a slot 23 (Figure 3) so that the said members can be pivoted as well as moved bodily inwardly and outwardly with respect to the crystal. This allows for the clamping of crystals of widely different dimensions. The remaining parts of the embodiment of Figure 3 are the same as those of Figures 1 and 2 and further description thereof is not necessary.

Instead of using pivoted pointed members for cooperation with the fixed member 4, screw-threaded pointed members may be employed. Thus as shown in Figure 4 members 24 and 25 may be screw-threaded into the wall of the housing or into any other suitable portion of the housing so that they engage the crystal edges 12 and 13 at their centers and cooperate with the projections 16 to 19 in the same way as do projections 5 and 6 of the embodiment of Figures 1 to 3.

Figure 5:
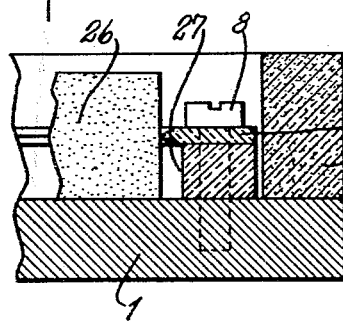
Figure 5 is a partial view showing a further embodiment.

The invention is particularly applicable to retainer mountings for crystals utilizing the "thickness" shear mode of vibration caused by an electrical field having a component in the Y direction (Figure 5). With such a crystal, it may be desirable to locate the retaining points at a plane passing through one-half the thickness (which is the nodal plane for the thickness vibrations) so as to dampen face shear vibrations. Such an arrangement is shown in the partial sectional view of Figure 5, wherein the members 4, 5 and 6 carrying the retaining projections are spaced above the base 1 by means of suitable spacer rings or washers 27. The remainder of the embodiment of Figure 5 may be the same as that of Figures 1 to 4. It will be obvious therefore, that by choosing washers 27 of different thickness, the knife-edged points can be located at any of the nodal planes of the crystal.

While in the drawing the various pointed projections are shown in contact with the crystal edges, it will be understood that in practice a minute clearance, for example of the order of .0005 inch is provided between the points and the crystal edges. Thus in assembling the crystal, feeler gauges or shims can be inserted between the crystal and the points which can be adjusted to contact with the shims. When the retainer members have been tightened in place, the shims can be removed to provide the necessary clearance.

While certain specific embodiments have been disclosed herein it will be understood that various changes and modifications may be made therein without departing from the spirit and scope of the invention.

What is claimed is:

1. A piezo crystal retaining arrangement comprising a pair of projections cooperating with one peripheral face of the crystal, a third projection cooperating with an opposite face of the crystal, the triangle defined by said projections having each of its interior angles less than 90°, another pair of projections cooperating with a second peripheral face of the crystal, and an additional projection cooperating with the peripheral face of the crystal opposite to said second face, the triangle defined by the last three mentioned projections having each of its interior angles less than 90°, all said projections being disposed so as to engage the corresponding lateral faces of the crystal only in a localized region determined by the nodal plane extending through the crystal transversely to said faces.

2. A piezo crystal retaining arrangement having means cooperating with the opposite peripheral edges of the crystal at three spaced points, two points being at one edge of the crystal and the third point being at an opposite peripheral edge, the triangle defined by said three points restraining translational movement of the crystal and rotation about one axis, and a similar three-point means cooperating with another pair of parallel opposed faces of the crystal to restrain translational and rotational movements thereof around an axis perpendicular to the first axis, all said points being located in a localized region determined by the nodal plane extending transversely to the lateral faces thereof.

3. A piezo crystal retaining arrangement according to claim 2 in which each of said third points is adjustably mounted for movement towards and away from the cooperating crystal edge.

4. A retaining arrangement for polygonal crystals comprising a member adjustably mounted with respect to each peripheral face of the crystal, said members being arranged in pairs cooperating with opposite faces of the crystal, one member of each pair having a plurality of pointed projections, and the other member of each pair having a single pointed projection, the triangle defined by said three pointed projections having each of its interior angles less than 90°, all said projections being disposed so as to engage the corresponding lateral faces of the crystal only in a localized region determined by the nodal plane extending through the crystal transversely to said faces.

5. A piezo-crystal retaining arrangement comprising tri-part means one member of which is fixed and the other two members relatively movable with respect thereto, each of said members having at least one pointed projection for engaging the crystal at a predetermined point along the edge of the crystal and located only in a localized region determined by the nodal plane extending through the crystal transversely to the lateral faces thereof.

6. A piezo-crystal retaining arrangement according to claim 12 in which the first two pairs of retainer points are carried on the arms of a relatively fixed member having a corner notch to receive a corner of the crystal, the other two points being independently adjustable toward the corresponding crystal edges.

7. A piezo-crystal retaining arrangement according to claim 5 in which said fixed member has a right angled cut-out to receive the right angled corner of a crystal, each side of the cut-out having a pair of spaced pointed projections whereby adjacent edges of the crystal engage said fixed member only at said pointed projections, and said other two members each has a pointed projection one engaging the crystal on a line between the pair of projections of the fixed member which pair of projections engage the opposite edge of the crystal.

8. A piezo-crystal retaining and clamping arrangement according to claim 10 in which said shiftable V-shaped point is carried by a member which is pivotally mounted with respect to the crystal.

9. A piezo-crystal retaining arrangement according to claim 10 in which the said shiftable point is carried by a threaded member which is adjustable perpendicular to the crystal edge.

10. A piezo-crystal retaining arrangement having means to engage the opposite parallel edges of a crystal at three spaced points lying only in a nodal planar region extending through the crystal transverse to the edge faces thereof, two points being at one edge of the crystal and the third point being at the opposite parallel edge of the crystal and symmetrically between said two points, said engaging means comprising a fixed member having a plurality of V-shaped points engaging the crystal symmetrically on opposite sides of a median line, and a shiftable V-shaped point engaging the opposite crystal edge at said median line.

11. A piezo-crystal retaining arrangement comprising a fixed member having a V-shaped recess, a plurality of other members swingably mounted with respect to the first member in substantially the same plane therewith, each of said members having at least one pointed projection for engaging the crystal at a predetermined point along the edge of the crystal and located in a localized region determined by the nodal plane extending through the crystal transverse to the lateral faces thereof.

12. A piezo-crystal retaining arrangement for crystals of the thickness shear mode of vibration, comprising a plurality of members provided with retainer points, there being three pairs of points, one pair being arranged to engage a first edge of the crystal and another pair being arranged to engage a second crystal edge adjacent to said first edge, the third pair of points being adjustably mounted so that one of the points of said third pair engages a crystal edge opposite said first edge and the other point of said third pair engages a crystal edge opposite said second edge, and means to locate said members in alignment with a localized region determined by the nodal plane extending through the crystal transversely to the lateral faces thereof.

13. A piezo-crystal retaining arrangement according to claim 10, wherein said nodal planar region is located substantially in the median plane of the crystal between the upper and lower faces thereof.

14. A piezo-crystal retaining arrangement comprising a pair of projections cooperating with one peripheral face of the crystal, a third projection cooperating with an opposite face of the crystal, the triangle defined by said projections having each of its interior angles less than 90°, and a second pair of projections, one of the projections of said second pair cooperating with a second peripheral face of the crystal and the other projection of said second pair cooperating with the peripheral face of the crystal opposite to said second face, all said projections being disposed so as to engage the corresponding lateral faces of the crystal only in a localized region determined by the nodal plane extending through the crystal transversely to said faces.

HENRY M. BACH.